(12) United States Patent
Swan

(10) Patent No.: US 6,678,465 B1
(45) Date of Patent: Jan. 13, 2004

(54) METHOD AND APPARATUS FOR RESTRICTING A VIDEO OUTPUT OF A COMPUTING SYSTEM BASED ON COPY PROTECTION INFORMATION

(75) Inventor: Philip Lawrence Swan, Toronto (CA)

(73) Assignee: ATI International, SRL (BB)

( * ) Notice: Subject to any disclaimer, the term of this patent is extended or adjusted under 35 U.S.C. 154(b) by 0 days.

(21) Appl. No.: 09/336,491

(22) Filed: Jun. 18, 1999

(51) Int. Cl.[7] ................................................ H04N 5/76
(52) U.S. Cl. ........................ 386/94; 360/60; 380/201
(58) Field of Search ........................ 386/1, 94; 360/60; 380/201, 205, 203; H04N 5/76, 5/781, 9/79

(56) References Cited

U.S. PATENT DOCUMENTS

| | | | | |
|---|---|---|---|---|
| 4,914,694 A | * | 4/1990 | Leonard et al. ................. 360/60 |
| 5,194,965 A | * | 3/1993 | Quan et al. ..................... 360/60 |
| 5,585,929 A | * | 12/1996 | Young et al. ................... 386/1 |
| 6,023,302 A | * | 2/2000 | MacInnis et al. ............. 348/597 |
| 6,330,393 B1 | * | 12/2001 | Usui et al. ..................... 386/94 |
| 6,356,704 B1 | * | 3/2002 | Callway et al. ................ 386/94 |
| 6,449,425 B1 | * | 9/2002 | Ogino ............................ 386/94 |

* cited by examiner

*Primary Examiner*—Thai Tran
(74) *Attorney, Agent, or Firm*—Vedder, Price, Kaufman & Kammholz, P.C.

(57) ABSTRACT

A method and apparatus includes processing for restricting at least one video output of a computing system based on copy protection information. Such processing begins by receiving a video signal and associated copy protection information (e.g., Macrovision). The processing continues by interpreting the copy protection information. When the copy protection information indicates copy restriction, the processing continues by altering at least one video output. The video output may be altered by disabling a monitor output, adjusting a refresh rate to be incompatible with a television refresh rate, altering an image of the video signal, and/or inserting a message in a non-current interlaced field of the video signal.

20 Claims, 2 Drawing Sheets

METHOD AND APPARATUS FOR RESTRICTING A VIDEO OUTPUT OF A COMPUTING SYSTEM BASED ON COPY PROTECTION INFORMATION

TECHNICAL FIELD OF THE INVENTION

This invention relates generally to computing systems and more particularly to restricting copying of video signals.

BACKGROUND OF THE INVENTION

Unauthorized copying of copyrighted work is, unfortunately, very prevalent. Such unauthorized copying ranges from simple copying of a few pages of a copyrighted book to widespread distribution of millions of dollars worth of illegally copied movies, compact discs, and other entertainment medium.

With the advent of digital videodiscs (DVD), the illegal copying of DVDs is of great concern to content companies (i.e., the companies owning the copyrighted work recorded on the DVDs). To protect the copyrighted works, content companies are demanding that DVD producers incorporate a security mechanism to prevent unauthorized copying. One such recommended security mechanism is currently being used in conjunction with videocassette recorders and was developed by Macrovision. The Macrovision technique (hereinafter referred to as Macrovision) essentially places additional coding in the vertical blanking interval and/or horizontal sync signals of a video stream provided to a television for display. The television filters out the additional coding with negligible adverse video effects, but a videocassette recorder (VCR) is not able to filter out the additional coding, thereby preventing the VCR from making quality copies.

While Macrovision prevents VCRs coupled to televisions from making quality copies, it does not prevent unauthorized copying by a personal computer (PC) that is coupled to a VCR and/or any other video source (including a DVD player, television broadcast, cable broadcast, etc). As is generally know, a PC may be equipped with an analog video decoder, such as the one contained in the All-in-Wonder Board manufactured and distributed by ATI International, which converts an analog video signal into a digital video data stream. The analog-to-digital conversion (ADC) of the analog video stream removes the Macrovision encoding. As such, the PC may copy the digital video data stream without degradation since the Macrovision encoding has been removed. Such potential unauthorized copying is unacceptable to content providers.

Therefore, a need exists for a method and apparatus that restricts a video output based on copy protection information, such as Macrovision.

DETAILED DESCRIPTION OF A PREFERRED EMBODIMENT

Generally, the present invention provides a method and apparatus that includes processing for restricting at least one video output of a computing system based on copy protection information. Such processing begins by receiving a video signal and associated copy protection information (e.g., Macrovision). The processing continues by interpreting the copy protection information. When the copy protection information indicates copy restriction, the processing continues by altering at least one video output. The video output may be altered by disabling a monitor output, adjusting a refresh rate to be incompatible with a television refresh rate, altering an image of the video signal, and/or inserting a message in a non-current interlaced field of the video signal. With such a method and apparatus, unauthorized copying of digitized video signals via an analog video signal output port is substantially reduced.

Figure 1:
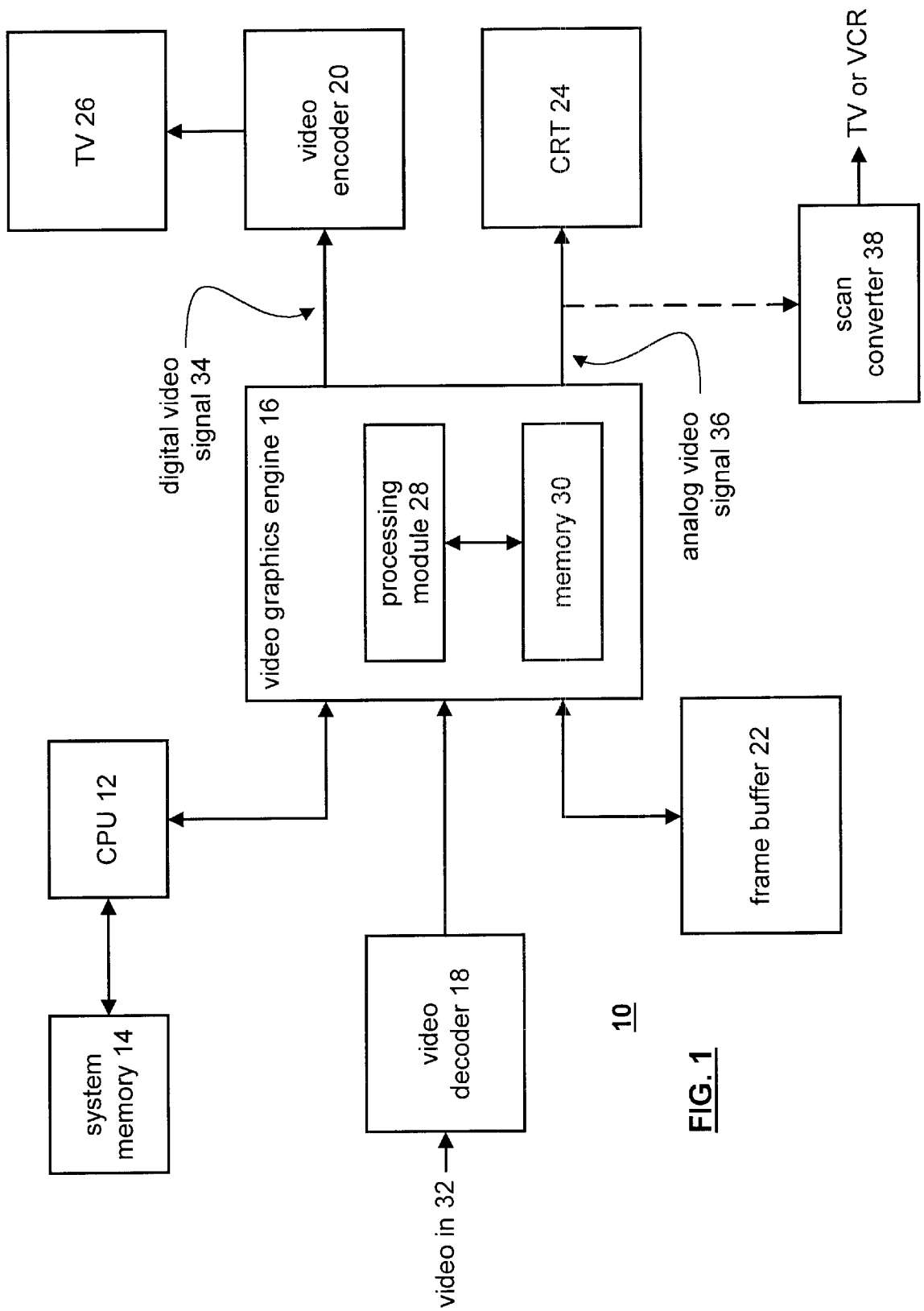
FIG. 1 illustrates a schematic block diagram of a computing system in accordance with the present invention.

The present invention can be more fully described with reference to FIGS. 1–3. FIG. 1 illustrates a computing system 10 that includes a central processing unit 12, system memory 14, video graphics engine 16, a video decoder 18, a video encoder 20, and a frame buffer 22. The computing system is operably coupled to a cathode ray tube (CRT) 24 and to a television 26. The central processing unit 12 and system memory 14 may be of the type found in a personal computer, laptop, workstation, etc. In operation, the central processing unit 12 provides graphical data to the video graphics engine 16, which processes the graphics data to produce display data.

The video graphics engine 16 includes a processing module 28 and memory 30. The processing module 28 may be a single processing device or a plurality of processing devices. Such a processing device may be a microprocessor, microcontroller, digital signal processors, microcomputer, a portion of the central processing unit, processing circuitry within a video graphics circuit, and/or any device that manipulates signals (analog or digital) based on operational instructions. The memory 30 may be a single memory device or a plurality of memory devices. Such a memory device may be a read-only memory, floppy disk memory, random access memory, hard drive memory, portion of the system memory, magnetic tape memory, and/or any device that stores digital information. Note that when the processing module 28 implements one or more of its functions utilizing a state machine or logic circuitry, the memory storing the corresponding operational instructions is embedded within the circuitry comprising the state machine and/or logic circuitry. The operational instructions stored in memory 30 and executed by processing module 28 would be discussed in greater detail with reference to FIGS. 2 and 3.

Video decoder 18, which may be of the type found in the All-in-Wonder board manufactured and distributed by ATI International, receives a video-in signal 32. The video decoder 18 digitizes the video signals 32 and provides the digitized video to the video graphics engine 16. In conjunction with the graphics data, the video graphics engine 16 prepares display data utilizing the frame buffer 22. The video graphics engine 16 produces a digital output 34 and an analog output 36. The digital video signals 34 are provided to a video encoder 20, which may be of the type found in the All-in-Wonder board manufactured and distributed by ATI International. Accordingly, the video encoder 20 receives the digital video signals 34 and produces fields of data for display on TV 26. The analog video signals 36 which are provided to the CRT monitor 24.

If one were intent on obtaining illegal copies of copyrighted works, one could include a scan converter 38 operably coupled to receive the analog video signals 36. Since the video graphics engine 16 does not process Macrovision signals, the analog video signal 36 does not include such copy protection information. Therefore, the scan converter 38 may capture fields of analog video signals that could be provided to a television or VCR for high quality copying. To prevent such unauthorized copying the video graphics engine 16 performs the processes as shown in FIG. 2 or FIG. 3.

Figure 2:
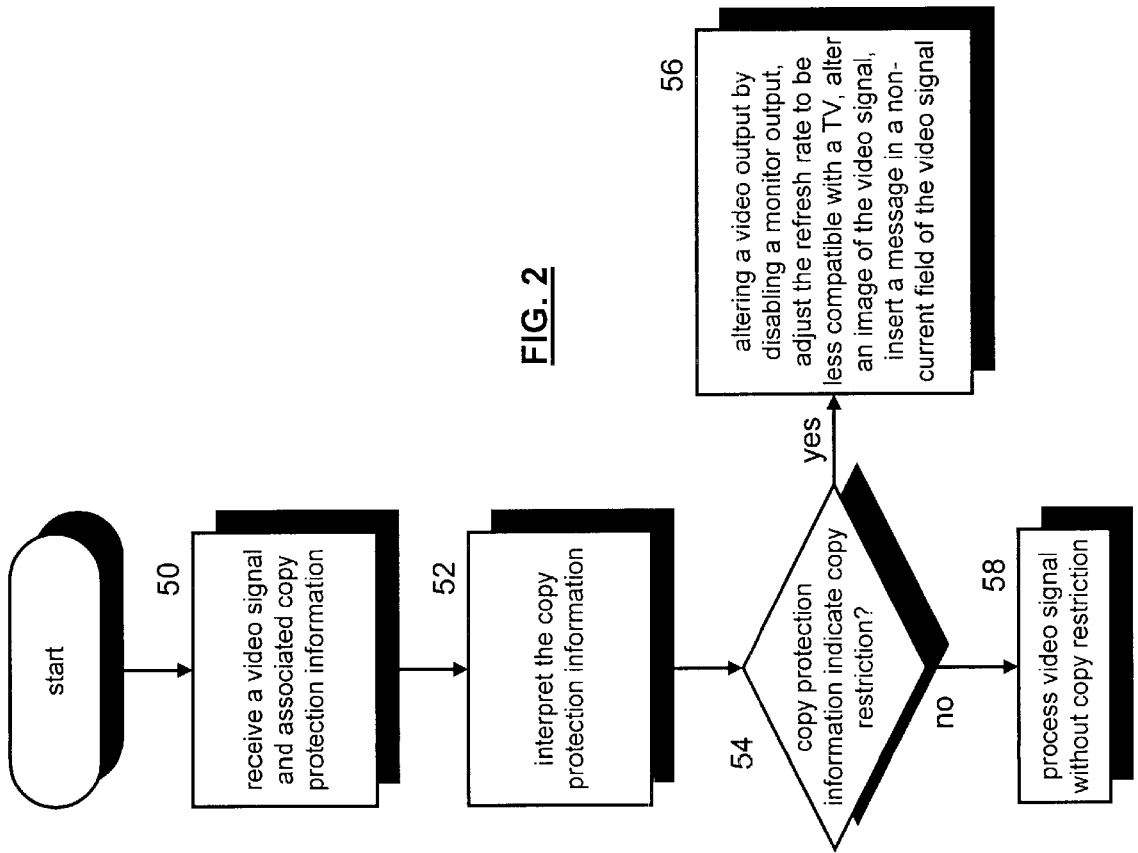
FIG. 2 illustrates a logic diagram of a method for restricting a video output based on copy protection information in accordance with the present invention.

FIG. 2 illustrates a logic diagram of a method for restricting at least one video output of a computing system based on copy protection information. The process begins at step 50 where a video signal and associated copy protection information is received. Note that the copy protection information may be Macrovision signals, embedded copy restriction information within the vertical blanking interval of a field of video input signals 32, or information contained within a horizontal sink component of a video signal. The process the proceeds to step 52 where the copy protection information is interpreted. In addition to interpreting the copy protection information, the process may also include interpreting system operation regarding the processing of the video signals. Such system operation may indicate that the digitized video signals are to be stored to memory without display. When the system operation is to store the digitized memory signals to memory without display, the storing also includes storing of the copy protection information. As such, when the stored information is retrieved and processed, to produce the digital video signals 34, the copy protection information encoding is included. As such, the video encoder 20 will reinsert the analog version of the copy protection information into the signals provided to the television. In addition, when the video graphics engine retrieves the stored video and copy protection information, it utilizes the information to process the analog video signals according with the following steps.

The process then proceeds to step 54 where a determination is made as to whether the copy protection information indicates copy restrictions. If not, the process proceeds to step 58 where the video signals are processed without copy restriction. If, however, the copy protection indicates copy restriction the process proceeds to step 56. At step 56, a video output is altered by disabling a monitor output, adjusting the refresh rate to be less compatible with a television, altering an image of the video signal, and/or inserting a message in a non-current field of the video signal. As one of average skill in the art will appreciate, a system may be equipped to perform one of these functions or a plurality of these functions. If equipped to perform a plurality of these functions, such functions may be established by user preference, encoded within the video signals, or based on default parameters established by the computing system manufacturer.

To disable a monitor output, the analog video signals 36 are not provided or are disrupted to degrade their quality. As such, by preventing the analog video signals 36, the scan converter 38 may not receive them and as such may not provide unauthorized copying. To adjust the refresh rate to be less compatible with the television, the video graphics engine 16 may output the analog video signals 36 at a refresh rate of 75 Hertz, 90 Hertz, 120 Hertz, etc. As is known, a television utilizes 59.94 Hertz as its refresh rate. A typical low-end scan converter 38 is operable to convert the typical analog graphics signals 36 which have a refresh rate near 50, or 59.94, Hertz and are designed to convert signals for displaying on a progressive display to signals for displaying on a television set. By converting the refresh rate to a higher rate, the scan converter 38 is not directly operational unless it is a high-end model with refresh rate conversion ability, which would require the scan converter 38 to include a frame buffer. As such, by adjusting the refresh rate, a low-end scan converter 38 is effectively disabled.

To alter an image of the video signal, the image may be scrambled, replaced with a blank screen, have its color data changed, have its intensity data changed, and/or have any other parameter of its color base information of the analog video signals 36 and the digital video signals 34 changed. To insert a message into a non-current field of the video signal, the video graphics engine 16 would receive graphics data from the central processing unit 12, or have contained within memory 30 a stored message, and provide the message in a non-current field of the video signal. By providing the message in the non-current field (i.e., the field not currently being seen on the television), the television output via the video encoder will not be affected. However, the analog video signals 36 will include the message since they are a composite of the even and odd fields. Such a message may be alpha-blended with the video signal 36, an advertising message, a message indicating that copying is unauthorized or any other type of message desired to dissuade one who would attempt to make unauthorized copies.

An additional technique that may be used to alter the analog video signals 36 is to change the interlace pattern during scene changes. By changing the interlace pattern (i.e., switching from odd-to-even to event-to-odd, or vise versa), the scan converter 38 cannot synchronize to the analog video signals 36, therefor it cannot produce a quality television output signal.

Another embodiment that may be used to copy protect video in a video graphics system includes a "friendly" scan converter that is responsible for copy protection of converted data using a copy protection method (e.g., Macrovision). The video graphics engine in this system will output data that would, using the techniques described above, be difficult for a non-friendly scan converter to display properly. It would also provide additional information that a friendly scan converter would be adapted to receive. The friendly converter would use the information to recover and display a better quality image. For example, the video graphics engine may provide cleanup data or avoidance data to the friendly scan converter allowing it to provide a clearer image than other wise possible.

Figure 3:
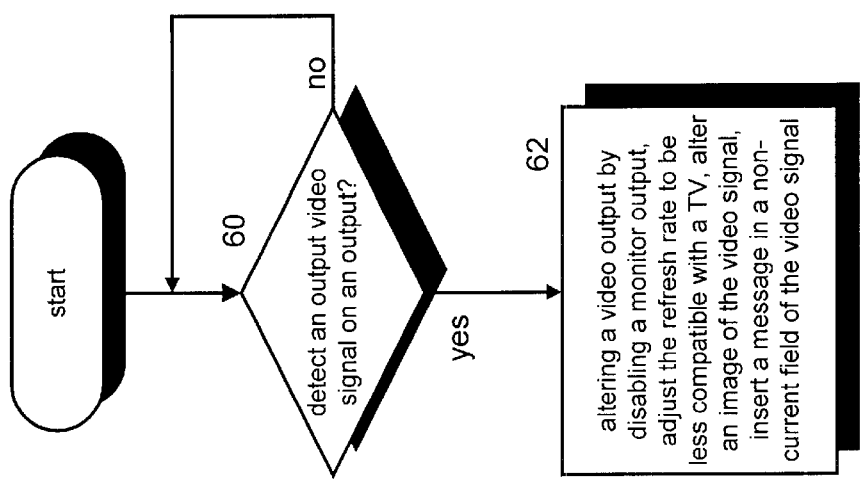
FIG. 3 illustrates a logic diagram of a method for restricting a video output in accordance with copy protection information.

FIG. 3 illustrates a logic diagram of an alternate method for restricting a video output of a computing system based on copy protection information. The processing begins at step 60 where a determination is made as to whether an output video signal is being produced. Such a determination may be made based on the fact that a video input signal 32 was received and has been converted by the video graphics engine to produce at least a portion of the digital video signals 34 and the analog video signals 36. If the output video signal is detected, the process proceeds to step 62. At step 62, the video output is altered by disabling a monitor output, adjusting the refresh rate to be less compatible with a television, altering an image of the video signal, and/or inserting a message in a non-current field of the video signal. As such, the method of FIG. 3 is active when a video input signal is being used to produce a video output signal and assumes that copy restriction is to always be invoked. The computing system may include mechanisms to disable the method of FIG. 3, but the default condition would be to have it active.

The preceding discussion has presented a method and apparatus for restricting video outputs of a computing system based on copy protection information. As such, a personal computer may be equipped with the teachings of the present invention and provide the copy protection that content providers demand for DVDs, VCR tapes, etc. As one of average skill in the art will appreciate, other embodiments may be derived from the teachings of the present invention without deviating from the scope of the claims or the spirit of the invention.

What is claimed is:

1. A method for restricting at least one video output of a computing system based on copy protection information, the method comprising the steps of:
   a) receiving a video signal and associated copy protection information;
   b) using a graphics engine to interpret the copy protection information; and
   c) when the copy protection information indicates copy restriction, altering the at least one video output by at least one of:
      disabling a monitor output;
      adjusting a refresh rate of the at least one video output to be less compatible with a television refresh rate;
      a television refresh rate;
      altering an image of the video signal; and
      inserting a message in a non-current interlaced field of the video signal.

2. The method of claim 1 further comprising, when inserting the message, alpha blending the message with the video signal.

3. The method of claim 2, wherein the message is at least one of: an advertisement and a copy restriction notice.

4. The method of claim 2 further comprising changing an interlace field pattern when a scene change occurs.

5. The method of claim 1, wherein step (b) further comprises:
   interpreting system operation regarding processing of the video signal; and
   when the system operation indicates a copy to a memory without display, storing the video signal and the copy protection information.

6. A method for restricting at least one video output of a computing system based on copy protection information, the method comprising the steps of:
   a) using a graphics engine to detect an output video signal on the at least one video output; and
   b) when the output video signal is detected, altering the at least one video output by at least one of:
      disabling a monitor output;
      adjusting a refresh rate of the at least one video output to be less compatible with a television refresh rate;
      altering an image of the video signal; and
      inserting a message in a non-current interlaced field of the video signal.

7. The method of claim 6 further comprising, when inserting the message, alpha blending the message with the video signal.

8. The method of claim 7, wherein the message is at least one of: an advertisement and a copy restriction notice.

9. The method of claim 7 further comprising changing an interlace field pattern when a scene change occurs.

10. The method of claim 6 further comprises:
    interpreting system operation regarding processing of the video signal; and
    when the system operation indicates a copy to a memory without display, storing the video signal and the copy protection information.

11. A computing system comprising:
    a graphics engine;
    wherein the graphics engine further comprises:
       a processing module; and
       memory operably coupled to the processing module, wherein the memory includes operational instructions that cause the processing module to: (a) receive a video signal and associated copy protection information; (b) interpret the copy protection information; and (c) when the copy protection information indicates copy restriction, alter the at least one video output by at least one of:
          disabling a monitor output;
          adjusting a refresh rate of the at least one video output to be less compatible with a television refresh rate;
          altering an image of the video signal; and
          inserting a message in a non-current interlaced field of the video signal.

12. The video graphics engine of claim 11, wherein the memory further comprises operational instructions that cause the processing module to, when inserting the message, alpha blend the message with the video signal.

13. The video graphics engine of claim 12, wherein the message is at least one of: an advertisement and a copy restriction notice.

14. The video graphics engine of claim 12, wherein the memory further comprises operational instructions that cause the processing module to change an interlace field pattern when a scene change occurs.

15. The video graphics engine of claim 11, wherein the memory further comprises operational instructions that cause the processing module to interpret the copy protection information by:
    interpreting system operation regarding processing of the video signal; and
    when the system operation indicates a copy to a memory without display, storing the video signal and the copy protection information.

16. A computing system comprising:
    a graphics engine;
    wherein the graphics engine further comprises:
       a processing module; and
       memory operably coupled to the processing module, wherein the memory includes operational instructions that cause the processing module to: (a) detect an output video signal on the at least one video output; and (b) when the output video signal is detected, alter the at least one video output by at least one of:
          disabling a monitor, output;
          adjusting a refresh rate of the at least one video output to be less compatible with a television refresh rate;
          altering an image of the video signal; and
          inserting a message in a non-current interlaced field of the video signal.

17. The video graphics engine of claim 16, wherein the memory further comprises operational instructions that cause the processing module to, when inserting the message, alpha blend the message with the video signal.

18. The video graphics engine of claim 17, wherein the message is at least one of: an advertisement and a copy restriction notice.

19. The video graphics engine of claim 17, wherein the memory further comprises operational instructions that cause the processing module to change an interlace field pattern when a scene change occurs.

20. The video graphics engine of claim 16, wherein the memory further comprise operational instructions that cause the processing module to:
    interpret system operation regarding processing of the video signal; and
    when the system operation indicates a copy to a memory without display, store the video signal and the copy protection information.

* * * * *